(12) United States Patent
Katzenberger et al.

(10) Patent No.: US 11,352,972 B2
(45) Date of Patent: Jun. 7, 2022

(54) ACTUATOR FOR A PIEZO ACTUATOR OF AN INJECTION VALVE

(71) Applicant: Continental Automotive GmbH, Hannover (DE)

(72) Inventors: Michael Katzenberger, Regensburg (DE); Michael Kausche, Regensburg (DE); Manfred Kramel, Mintraching (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 661 days.

(21) Appl. No.: 16/319,394

(22) PCT Filed: Jul. 12, 2017

(86) PCT No.: PCT/EP2017/067522
§ 371 (c)(1),
(2) Date: Jan. 21, 2019

(87) PCT Pub. No.: WO2018/015241
PCT Pub. Date: Jan. 25, 2018

(65) Prior Publication Data
US 2019/0331046 A1    Oct. 31, 2019

(30) Foreign Application Priority Data

Jul. 22, 2016 (DE) ..................... 10 2016 213 522.8

(51) Int. Cl.
*G05B 15/02* (2006.01)
*F02D 41/20* (2006.01)
(Continued)

(52) U.S. Cl.
CPC ..... *F02D 41/2096* (2013.01); *F02D 41/1402* (2013.01); *F02D 41/2438* (2013.01);
(Continued)

(58) Field of Classification Search
CPC .................................................. F02D 41/2096
See application file for complete search history.

(56) References Cited

U.S. PATENT DOCUMENTS

| | | | |
|---|---|---|---|
| 7,019,436 B2 | 3/2006 | Rueger et al. | 310/316.03 |
| 7,732,946 B2 | 6/2010 | Götzenberger | 307/115 |

(Continued)

FOREIGN PATENT DOCUMENTS

| | | | |
|---|---|---|---|
| CN | 1581667 A | 2/2005 | F02D 41/20 |
| CN | 101558228 A | 10/2009 | F02D 41/20 |

(Continued)

OTHER PUBLICATIONS

English Translation of NPL 102009026847 (Year: 2009).*

(Continued)

*Primary Examiner* — Bryan P Gordon
(74) *Attorney, Agent, or Firm* — Slayden Grubert Beard PLLC

(57) ABSTRACT

Various embodiments include a method for actuating a piezo actuator of an injection valve of a fuel injection system comprising: determining actuation signals for the piezo actuator using a stored current/voltage characteristic curve for carrying out an injection process; detecting the profile of the current flowing through the piezo actuator during the injection process and the profile of the voltage applied to the piezo actuator during the injection process; adapting the stored current/voltage characteristic curve based at least in part on the detected current profile and the detected voltage profile; and determining actuation signals for the piezo actuator using the stored, adapted current/voltage characteristic curve for carrying out a subsequent injection process.

6 Claims, 9 Drawing Sheets

(51) Int. Cl.
*F02D 41/14* (2006.01)
*F02D 41/24* (2006.01)

(52) U.S. Cl.
CPC ......... *F02D 41/2467* (2013.01); *G05B 15/02* (2013.01); *F02D 2041/1433* (2013.01); *F02D 2041/2024* (2013.01); *F02D 2041/2027* (2013.01); *F02D 2041/2058* (2013.01); *F02D 2041/2068* (2013.01)

(56) References Cited

U.S. PATENT DOCUMENTS

| | | | |
|---|---|---|---|
| 8,082,903 B2 | 12/2011 | Lehr et al. | 123/490 |
| 8,714,140 B2 | 5/2014 | Borchsenius et al. | 123/494 |
| 9,820,637 B2 | 11/2017 | Igarashi et al. | |
| 10,865,727 B2 | 12/2020 | Jahn et al. | |
| 2005/0235965 A1* | 10/2005 | Rohatschek | F02D 41/2096 310/316.03 |
| 2007/0227507 A1 | 10/2007 | Gotzenberger | 123/498 |
| 2007/0240685 A1 | 10/2007 | Beilharz et al. | 123/498 |
| 2008/0116855 A1 | 5/2008 | Augesky et al. | 320/166 |
| 2008/0202475 A1* | 8/2008 | Gotzenberger | F02D 41/2096 123/480 |
| 2010/0059021 A1 | 3/2010 | Rau et al. | 123/478 |
| 2010/0095936 A1* | 4/2010 | Schempp | F02D 41/2096 123/478 |
| 2012/0031378 A1 | 2/2012 | Brandt | 123/490 |
| 2015/0184626 A1 | 7/2015 | Denk | 123/478 |

FOREIGN PATENT DOCUMENTS

| | | | |
|---|---|---|---|
| CN | 101595291 A | 12/2009 | F02D 41/20 |
| DE | 10 2008 042 146 A1 | 3/2010 | H02N 2/06 |
| DE | 10 2009 018 289 B3 | 6/2010 | F02D 41/20 |
| DE | 10 2009 026 847 A1 | 3/2011 | F02D 41/20 |
| DE | 10 2012 213 883 A1 | 2/2014 | F02D 41/20 |
| DE | 102015217955 A1 | 4/2016 | F16K 37/00 |
| DE | 10 2016 210 449 B3 | 6/2017 | F02D 41/20 |
| GB | 2463024 A | 3/2010 | F02D 41/20 |
| JP | 2003-088145 A | 3/2003 | F02D 41/20 |
| JP | 2005016431 A | 1/2005 | F02D 41/20 |
| JP | 6146976 B2 | 6/2017 | A61B 1/04 |
| KR | 20010095229 A | 11/2001 | F02D 41/20 |
| KR | 20080082598 A | 9/2008 | F02D 41/20 |
| KR | 20110031913 A | 3/2011 | F02D 41/00 |
| KR | 20170080661 A | 7/2017 | F02D 41/20 |
| WO | 2005/061876 A1 | 7/2005 | F02D 35/02 |
| WO | 2006/069869 A1 | 7/2006 | F02D 41/20 |
| WO | 2018/015241 A1 | 1/2018 | F02D 41/14 |

OTHER PUBLICATIONS

Chinese Office Action, Application No. 201780045566.8, 17 pages, dated Jan. 12, 2021.
German Office Action, Application No. 10 2016 213 522.8, 7 pages, dated Jan. 25, 2017.
International Search Report and Written Opinion, Application No. PCT/EP2017/067522, 25 pages, dated Oct. 6, 2017.
Korean Notice of Allowance, Application No. 20197005110, 4 pages, dated May 11, 2020.
Chinese Office Action, Application No. 201780045566.8, 17 pages, dated Aug. 4, 2021.

* cited by examiner

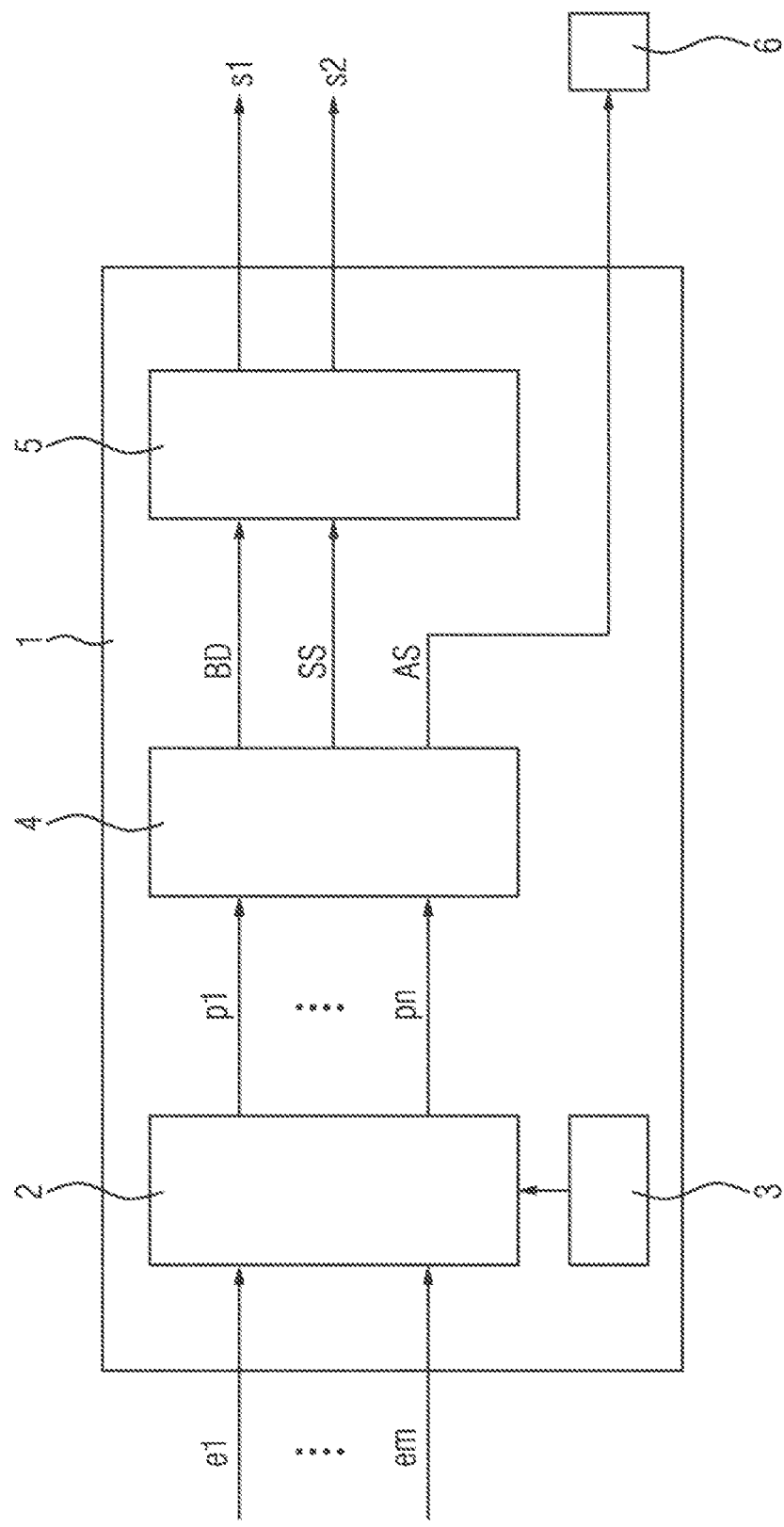

ACTUATOR FOR A PIEZO ACTUATOR OF AN INJECTION VALVE

CROSS-REFERENCE TO RELATED APPLICATIONS

This application is a U.S. National Stage Application of International Application No. PCT/EP2017/067522 filed Jul. 12, 2017, which designates the United States of America, and claims priority to DE Application No. 10 2016 213 522.8 filed Jul. 22, 2016, the contents of which are hereby incorporated by reference in their entirety.

TECHNICAL FIELD

The present disclosure relates to internal combustion engines. Various embodiments may include methods and devices for actuating a piezo actuator of an injection valve of a motor vehicle.

BACKGROUND

Many fuel injection systems include a common rail and use piezoelectrically operated injection valves. For example, one or more injection valves, which can be opened and closed in a targeted manner, are located at each combustion chamber. During the opening of the injection valves, fuel reaches the interior of the combustion chamber and burns there. From a combustion and exhaust point of view and for reasons of comfort, a very accurate dosage of the injected amount of fuel is required.

The injection processes are therefore controlled by a control unit. This control unit provides the control signals required by the output stage of the injection system. To identify these control signals, the control unit operates according to a stored operating program and stored characteristic maps and in the process evaluates sensor signals supplied by sensors arranged in the injection system. When said control signals are identified, the manner in which the fuel is introduced into the respective combustion chamber is of great importance. This is implemented by a respectively suitable injection curve shaping, by way of which undesirable exhaust emissions can be avoided. A major influencing factor for an exact fuel injection is the implementation of a respective injector current profile prescription, which is directly or indirectly proportional to the desired injection valve movement and thus to the injection profile.

To display an injector current profile prescription as precisely as possible, exact injection timing and consideration of component variations in the control unit, the supply lines and the injector are required. In practice, said components are provided for reasons of cost with comparatively large tolerances, wherein said comparatively large tolerances have undesirable influences on the accuracy of the fuel injection. Until now, said undesirable influences on the accuracy have been accepted in many cases.

In other cases, said comparatively large component tolerances have been taken into account as the sum of all errors in the injection profile or as errors in the total injection quantity, or controllers have been used for energy equalization or charge quantity equalization. However, there has always been the problem of undesired dead times and undesired control tolerances. In addition, only the sum of the errors at the end of a charging process has always been considered and a correction was made on this basis. The discharging process has not often been considered here.

Some systems use a trapezoidal shape with predetermined rise and fall times to a or from a respectively desired maximum current as a standard current form for actuating a piezo actuator. Furthermore, to increase the flexibility of an injection process, it is known to replace said trapezoidal shape with a multi-stage current form in order to be able to positively influence the combustion result and thus the emissions.

SUMMARY

The teachings of the present disclosure describe a method and a device for actuating a piezo actuator of an injection valve of a fuel injection system, in which the accuracy of an injection process in conjunction with higher flexibility in the actuation of the injection valve is further improved. For example, some embodiments may include a method for actuating a piezo actuator of an injection valve of a fuel injection system, comprising the following steps: identifying actuation signals for the piezo actuator using a stored current/voltage characteristic curve for carrying out an injection process, detecting the profile of the current flowing through the piezo actuator during the injection process and the profile of the voltage applied to the piezo actuator during the injection process, adapting the stored current/voltage characteristic curve using the detected current profile and the detected voltage profile, and identifying actuation signals for the piezo actuator using the stored, adapted current/voltage characteristic curve for carrying out a subsequent injection process.

In some embodiments, a free setpoint current prescription independent of the trapezoidal shape is identified taking into account the actual behavior of the individual injection system.

In some embodiments, the measured current profile and the measured voltage profile or the current/voltage characteristic identified therefrom are filtered before the adaptation of the stored current/voltage characteristic curve.

As another example, some embodiments may include a device for actuating a piezo actuator of an injection valve of a fuel injection system, which device has a control unit for identifying actuation signals for the piezo actuator, characterized in that the control unit is designed to carry out a method having the features specified above.

BRIEF DESCRIPTION OF THE DRAWINGS

Teachings of the present disclosure will emerge from the below exemplary explanation thereof on the basis of the figures. In the drawings:

FIG. 9 shows a block diagram of a control unit incorporating teachings of the present disclosure.

DETAILED DESCRIPTION

In some methods incorporating the teachings herein, the following steps are carried out to actuate a piezo actuator of an injection valve of a fuel injection system:

identifying actuation signals for the piezo actuator using a stored current/voltage characteristic curve for carrying out an injection process, detecting the profile of the current flowing through the piezo actuator during the injection process and the profile of the voltage applied to the piezo actuator during the injection process, adapting the stored current/voltage characteristic curve using the detected current profile and the detected voltage profile, and identifying actuation signals for the piezo actuator using the stored, adapted current/voltage characteristic curve for carrying out a subsequent injection process.

In some embodiments, during a complete injection process, the profile of the current flowing through the piezo actuator and the profile of the voltage dropped across the piezo actuator are detected and used to adapt a stored current/voltage characteristic curve, which in turn is used to identify the actuation signals for a subsequent injection process. In some embodiments, the characteristic of the individually present output stage is taken into account in the identification of the actuation signals for the injection processes. In this procedure, particularly component variations in the control unit, the supply lines, and in the injector are taken into account in the identification of the control signals for the injection processes.

Consequently, said control signals are identified taking into account the real output stage behavior of the individually present output stage. This makes it possible to predict the behavior of the individually present output stage when identifying the setpoint current prescription for a respectively subsequent injection process in such a way that a respective desired actual current profile is obtained. This identification of the setpoint current prescription is effected taking into account the actual behavior of the individually present injection system and is preferably a free setpoint current output independent of the trapezoidal shape.

Higher requirements for the reduction of the exhaust emissions of future motor vehicles can also be met by means of the methods described herein. In some embodiments, the current profile and the voltage profile are filtered using the detected current profile and the detected voltage profile before the adaptation of the stored current/voltage characteristic curve, in order to prevent or at least greatly reduce influences of undesired interference frequencies on the identification of the control signals for a subsequent injection process. Such interference frequencies can be caused, for example, by electromagnetic oscillations in the circuit (resonant circuit) or from the outside by electromagnetic interference.

Figure 1:
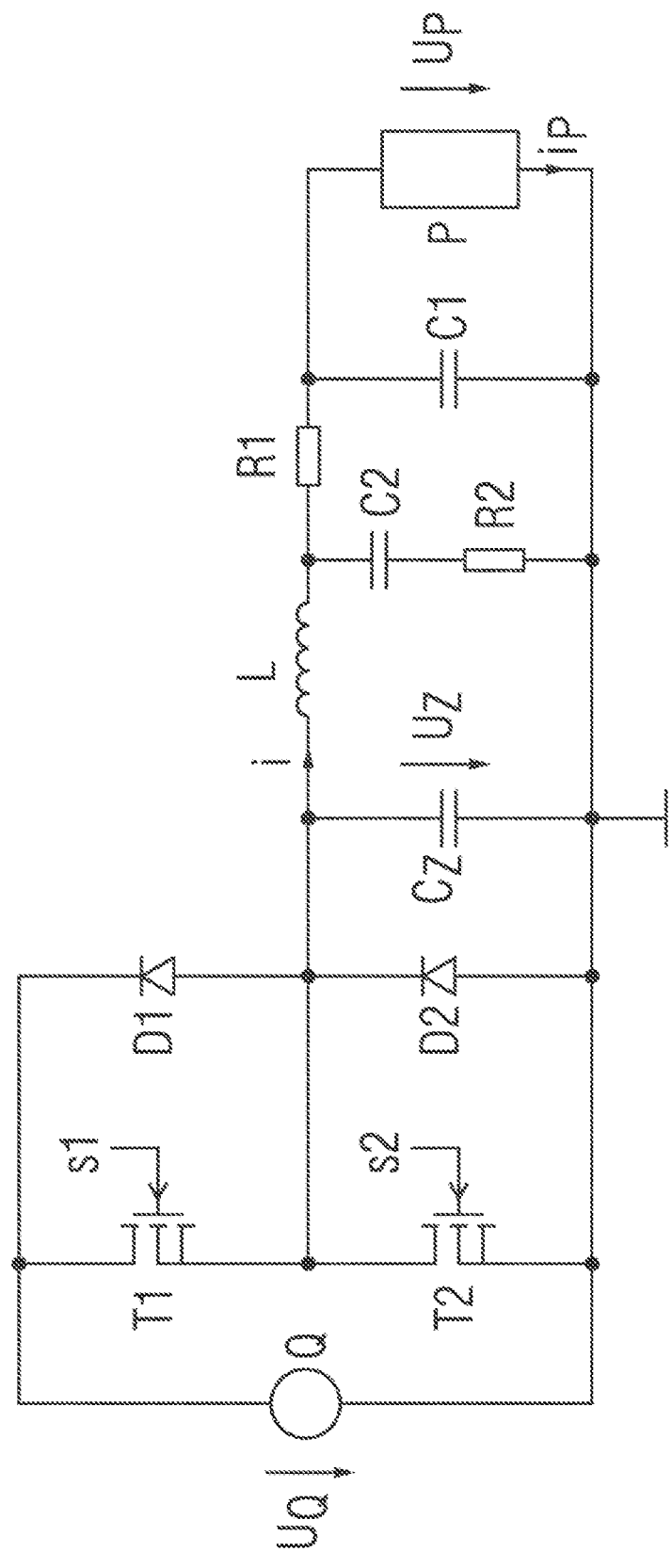
FIG. 1 shows an illustration of a current-controlled piezo output stage incorporating teachings of the present disclosure.

FIG. 1 shows an illustration of a current-controlled piezo output stage, which can be used in a method for actuating a piezo actuatdr of an injection valve of a fuel injection system. This piezo output stage has a 2-quadrant buck-boost converter, which includes a buck converter T1, D2 and a boost converter T2, D1. The transistor T1 of the buck converter, which is implemented as a field-effect transistor, is actuated by a control signal s1. The transistor T2 of the boost converter, which is likewise implemented as a field-effect transistor, is actuated by a control signal s2. The control signals s1 and s2 are made available by a control unit, as is explained in conjunction with FIG. 6.

The connecting point between the diodes D1 and D2 of the buck-boost converter is connected to a terminal of an intermediate capacitor $C_Z$, the other terminal of which is connected to ground. A voltage $U_Z$, referred to below as the intermediate voltage, is applied to this intermediate capacitor $C_Z$. Furthermore, the connecting point between the diodes D1 and D2 is connected to a terminal of a coil L, which is the main inductor of the piezo output stage. The other terminal of this main inductor is connected to the piezo actuator P via a low pass filter R1/C1. A current i flows through the coil L, and a current $i_P$ flows through the piezo actuator. A voltage $U_P$, referred to below as the piezo voltage, drops across the piezo actuator.

The topology of the illustrated piezo output stage can be described in simplified form by an anti-parallel connection of the buck converter and of the boost converter. The operating modes of this piezo output stage are distinguished by the fact that the coil current i of the main inductor L is higher than zero in the buck mode and lower than zero in the boost mode. In this context, there is no overlap between these two operating modes in the piezo output stage. Therefore, it is sufficient, as illustrated in FIG. 1, to use just one coil as a main inductor.

In the buck operating mode, the piezo actuator P is charged. During this charging, the switch T1 is alternately switched on and off by means of pulse width modulation. During the switch-on time of T1, the diode D2 initially acts in a blocking fashion, and the current flowing through the coil L rises. In this case, energy is built up in the coil which serves as a magnetic accumulator. In this case, the current rises evenly according to the relationship specified in the following equation (1):

$$i = 1/L \int u \, dt \qquad (1).$$

At the start of the charging process, the voltage applied to the coil corresponds approximately to the value of the direct voltage $U_Q$ made available by the voltage source Q.

The differential current of the main inductor L in the switch-on phase of T1 can be described by the following equation (2):

$$di/dt = (U_Q - U_P)/L \qquad (2).$$

During the switch-off phase of T1, the energy stored in the inductor is reduced. In this context, the diode D2 acts in freewheeling fashion, with the result that the load current can flow on. Since the output voltage is now applied to the coil, the polarity of the coil voltage changes. The output current decreases continuously here. In this case, the piezo actuator P is fed by the coil. The following relationship applies for a differential consideration of the current at the main inductor during the switch-off phase:

$$di/dt = (-U_P)/L \qquad (3).$$

The discharging of the piezo actuator P is carried out using the boost converter, wherein the piezo actuator P acts as a voltage source. During the discharging of the piezo actuator, the coil current i is lower than zero. Just like the buck converter in the charging phase, the boost converter is operated with pulse width modulation in the discharging phase. During the switch-on phase of T2, a freewheeling operation firstly occurs. This means that the current flows through the switch T2, with the result that the current flowing through the coil rises. In the switch-off phase of T2, feedback takes place into the voltage source Q via both diodes D1 and D2. In this context, the current flows from the consumer, i.e. the piezo actuator P, back into the source Q via the coil L. The following relationship applies to the differential current:

$$di/dt = U_P/L \quad (4).$$

The following relationship applies to the differential current during the switch-off phase of T2:

$$di/dt = (U_P - U_Q)/L \quad (5).$$

Owing to the method of functioning of the 2-quadrant converter, the power conversion of the piezo actuator is reduced during the discharging phase as the level of the piezo voltage drops. This results in a significantly longer discharging time being set, with the result that the piezo actuator possibly does not discharge completely. In order to avoid this, a current-controlled resistor (not shown) is connected in parallel with the piezo actuator P during discharging.

Figure 2:
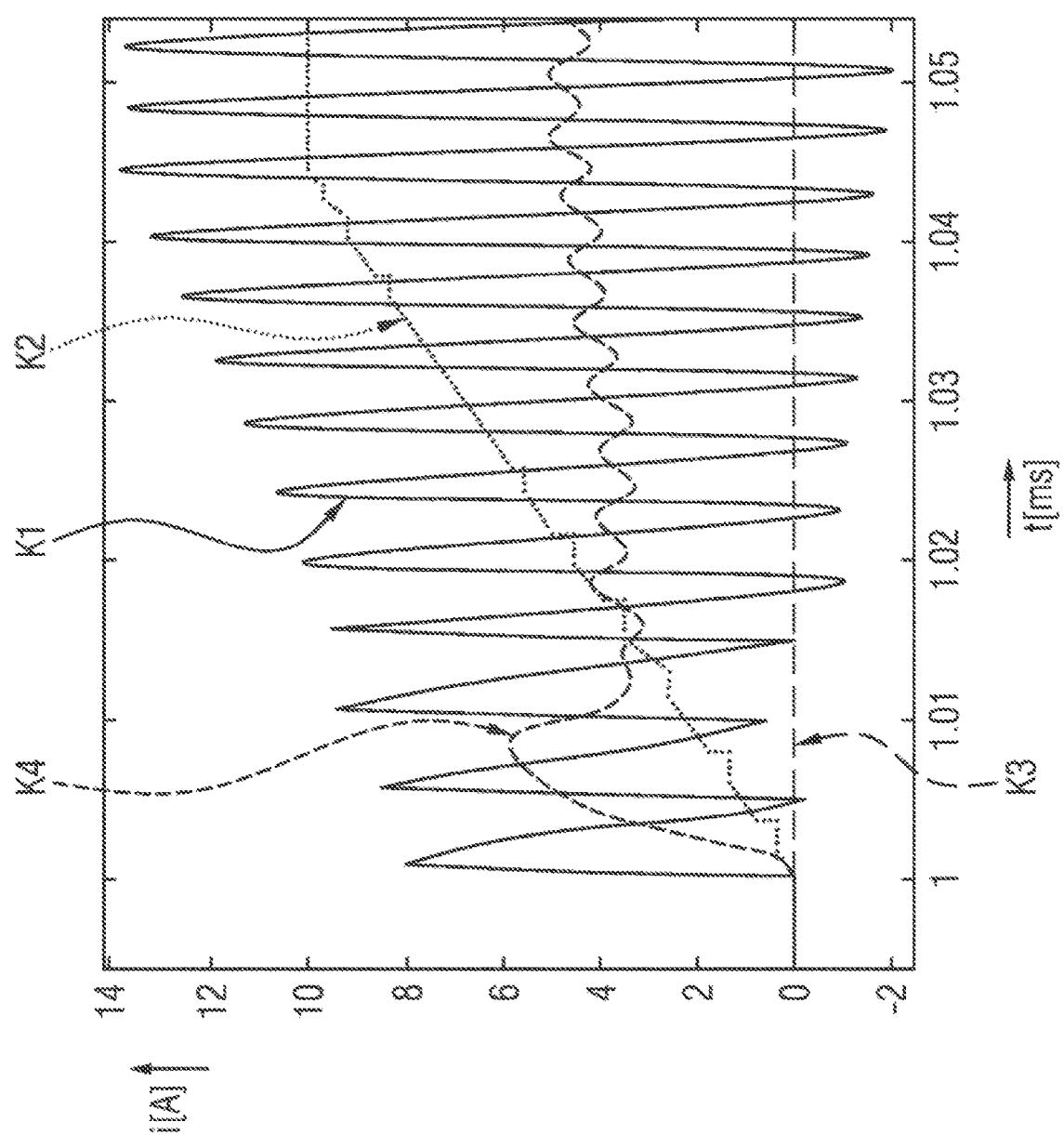
FIG. 2 shows a graph for illustrating the behavior of the comparator during the charging process, incorporating teachings of the present disclosure.

The pulse width modulation mentioned above results from the use of comparator thresholds, as illustrated in FIG. 2.

In this FIG. 2, the current is plotted at the top in amperes and the time is plotted on the right in milliseconds. Curve K1 illustrates the actual current flowing through the coil L, curve K2 illustrates a desired setpoint current corresponding to an upper comparator threshold, curve K3 corresponds to the zero value of the current forming a lower comparator threshold, and curve K4 illustrates the actual current flowing through the piezo actuator P. The desired setpoint current of the coil L is compared with the associated actual current by means of a comparator. If, for example during the charging of the piezo actuator, the actual current exceeds the predefined setpoint current after the switching on of the switch T1, the comparator output switches off the switch T1, with the result that the actual current decreases again. If the decreasing actual current reaches the zero crossover, T1 is switched on again. These processes are repeated until a desired predefined charging time is reached.

The pulse width modulation taking place during the discharging process is performed in an equivalent fashion. As an alternative to the above-described use of a comparator, other specific modes can also be used for the pulse width modulation. Another specific mode consists, for example, in using a controlled pulse operation of the first pulses on the basis of the minimum switching time behavior of the switches used.

It is possible to derive from the above-described use of a dynamic pulse width modulation that the current gradient has a significant influence on the switching behavior of the switches T1 and T2 used. As is apparent from the equation (2) specified above, the rising function of the current is influenced mainly by the voltage difference between $U_Q$ and the piezo voltage $U_P$.

Figure 3:
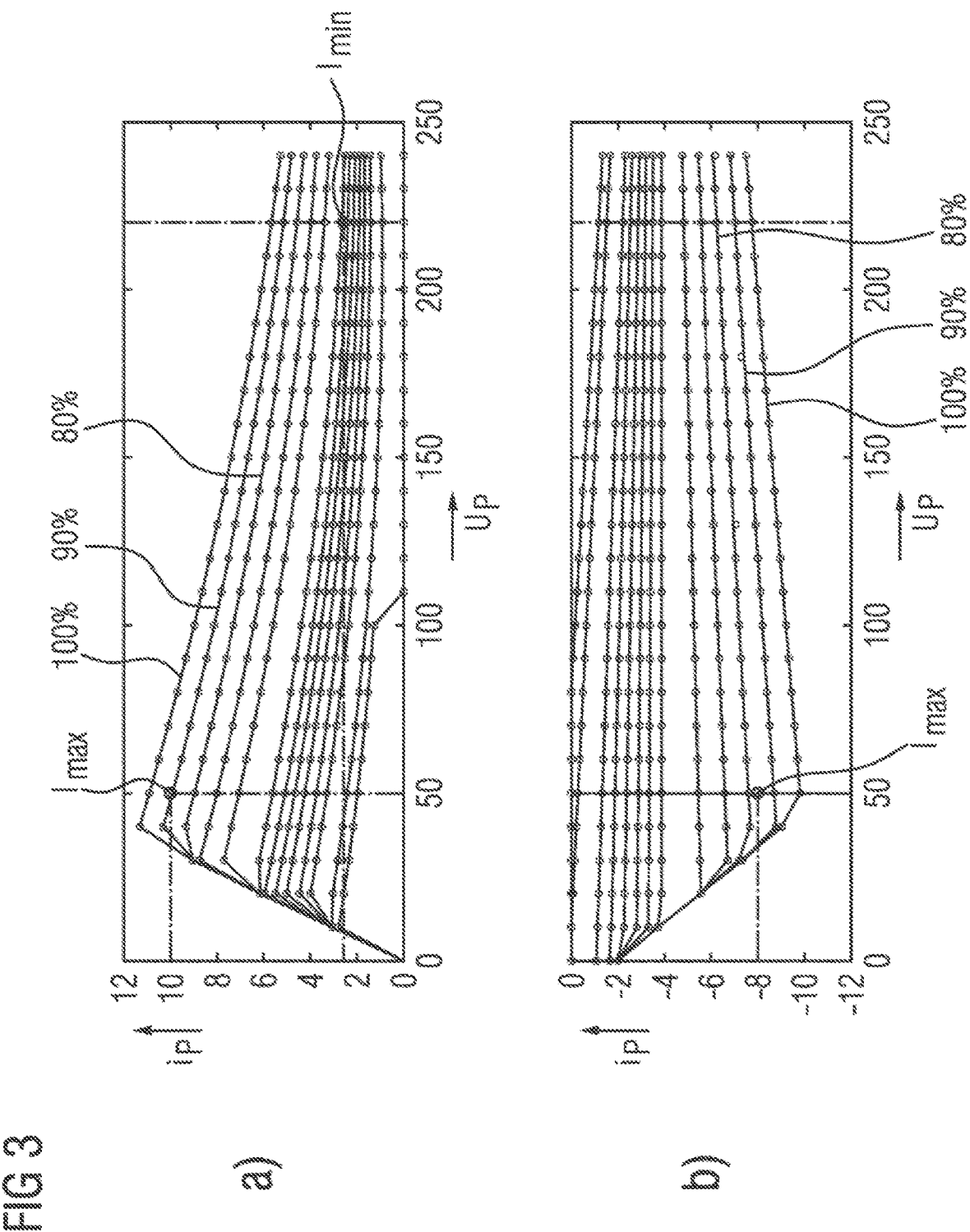
FIG. 3 shows graphs for illustrating current profiles for the charging process and the discharging process of a piezo actuator as a function of the piezo voltage, which describe a characteristic of the output stage, incorporating teachings of the present disclosure.

If the profiles of the piezo voltage $U_P$ and of the piezo current $i_P$ are transferred to a graph for a current setpoint value, a voltage/current characteristic curve characterizing the behavior of the output stage is obtained. This is illustrated herein on the basis of FIG. 3. Said FIG. 3 shows the current profiles for the charging process (FIG. 3a) and the discharging process (FIG. 3b) of the piezo actuator in conjunction with the piezo output stage. The resulting absolute currents are plotted against the piezo voltage at which they are present. The individual lines correspond here to a specific setpoint current intensity specified as a percentage of the maximum current intensity. The 100% curve, which in FIG. 3a corresponds to the top line, represents the fastest possible charging process in this context. It is apparent that as the voltage rises relatively low values of the absolute currents are available if the setpoint current prescription is kept constant. This results in a slowed-down charging or discharging process. Furthermore, it is apparent that at low voltages (<50V) it is not possible to reach certain current ranges. The cause of this is a limitation of the permissible current gradient. The curves illustrated below the top line in FIG. 3a are the 90% curve, the 80% curve, the 70% curve etc.

The curve profiles shown in FIGS. 3a and 3b are curve profiles that were identified before the start-up of the injection system for a reference output stage and were stored in a memory. In the case of the piezo actuators used in later real operation and output stages subject to component variation, the current/voltage characteristic curves actually present deviate from the respective reference characteristic curves illustrated in FIG. 3. In particular, they are shifted up, down, to the right or to the left. Consequently, in real operation, a profile deviating from the respective reference characteristic curve, a deviating total charge/energy and a changed injection profile resulting therefrom are present.

The current profiles shown in FIG. 3 permit a regression in the form of a two-dimensional polynomial with coefficients a to f. The range of low voltages is ignored here, since it is not relevant to the application.

$$I[A] = a*I[\%]^2 + b*I[\%] + c*U[V]^2 + d*U[V] + e*I[\%]*U[V] + f \quad (6)$$

In this context:
I[A] denotes the piezo absolute current intensity,
I[%] denotes the piezo setpoint current intensity,
U[V] denotes the piezo voltage.

In some embodiments, costly storage and reading out of the current values for the iteration process described below can be avoided. In some embodiments, the above-described model-like description of the output stage is used in the control unit in order to determine the energization data of the piezo actuator during the charging and the discharging. In this context, iteration is carried out starting from a setpoint value for the steady-state final voltage or final charging and a predefined trapezoidal setpoint current configuration. In this context, chronological discretization of the charging process and/or discharging process takes place. For each time step, the absolute current, the associated discrete charge quantity and the piezo voltage which is set are identified.

The basis for this is the polynomial regression model described above. The number of necessary time steps that reflect the desired setpoint charge state/setpoint voltage state corresponds to the charging time and/or discharging time, i.e. the energization period, to be determined. The calculation rules for each iteration step are as follows:

Setpoint current configuration value for the current time step:

cur_step = cur_step + step_cur_1

Determination of the absolute current:

$$i\_step = f(v\_step, cur\_step) \text{ (see equation (6))}$$

Determination of the piezo voltage which is set (simplified piezo model):

$$v\_step = v\_step + (i\_step \cdot dt)/(q\_stat/(v\_stat - (R\_piezo \cdot i\_step)))$$

Determination of the charge which is set:

$$q\_step = q\_step + (i\_step \cdot dt)$$

In this context the following applies:
i_step=absolute current state from the polynomial model [A]
v_step=voltage state [V]
cur_step=setpoint current state [%]
q_step=charge state [As]
step_cur_1=increment of the setpoint current in the case of rising functions [%]
dt=time increment [s]
q_stat=steady-state setpoint charge value (model input) [As]
v_stat=steady-state setpoint voltage value (model input) [V]
R_piezo=ohmic resistance of the piezo actuator [Ohm].

Figure 4:
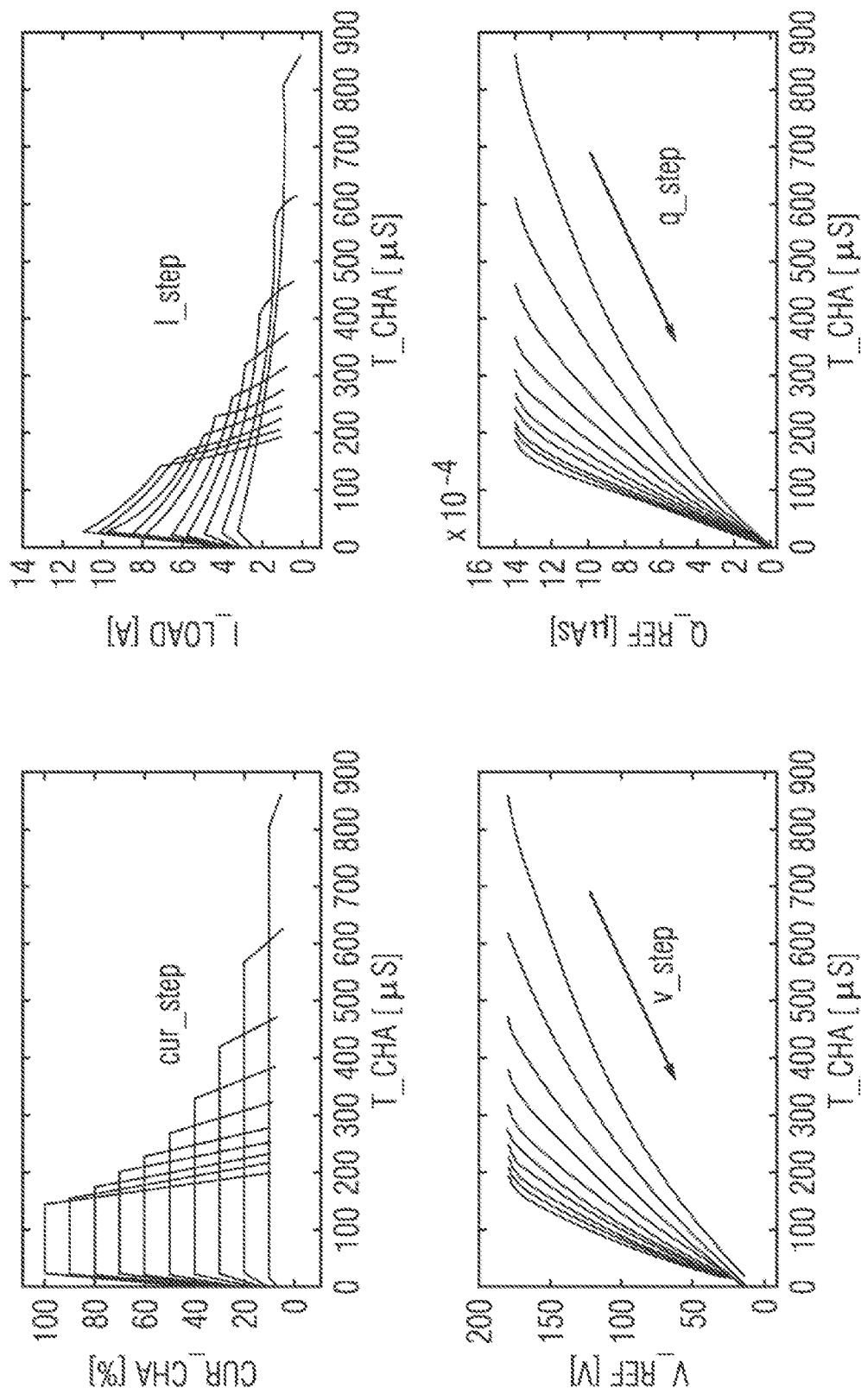
FIG. 4 shows graphs for illustrating the identification of the energization data, incorporating teachings of the present disclosure.

FIG. 4 shows the calculated current profiles (I_LOAD/i_step), voltage profiles (V_REF/v_step) and charge profiles (Q_REF/q_step) in the case of a trapezoidal setpoint current prescription (CUR_CHA/cur_step) as a function of the charging time (T_CHA). The individual curves each correspond to a specific trapezoidal configuration composed of a rising current edge, holding phase and falling current edge. It becomes apparent that each configuration corresponds precisely to a charging time if the same final values for the voltage and charge are to be achieved.

Figure 5:
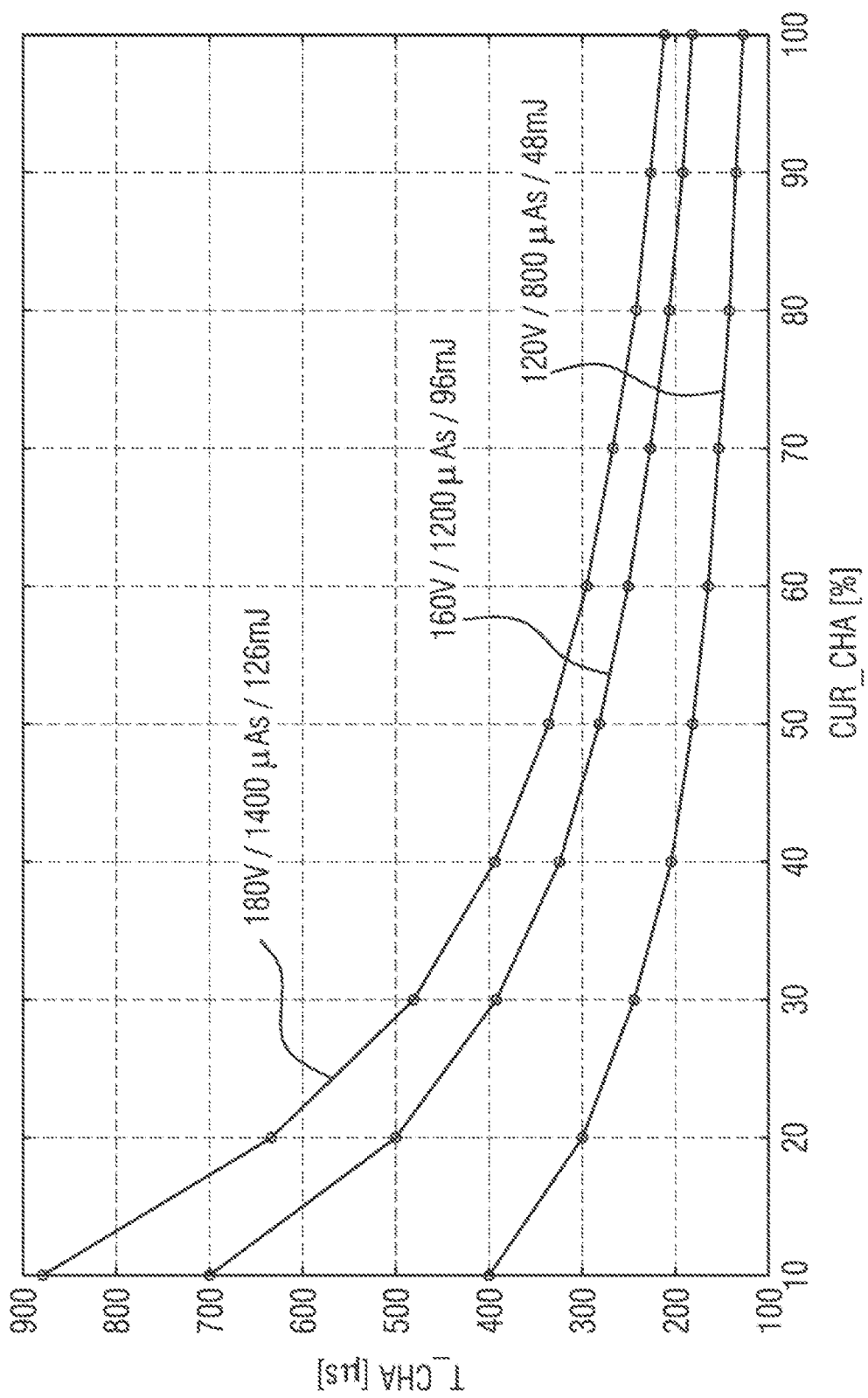
FIG. 5 shows a graph for illustrating the relationship between the calculated charging time and the setpoint current, incorporating teachings of the present disclosure.

FIG. 5 shows a graph illustrating the relationship between the calculated charging time T_CHA and the setpoint value CUR_CHA of the current at different setpoint values for the steady-state final voltage and/or final charge.

Figure 6:
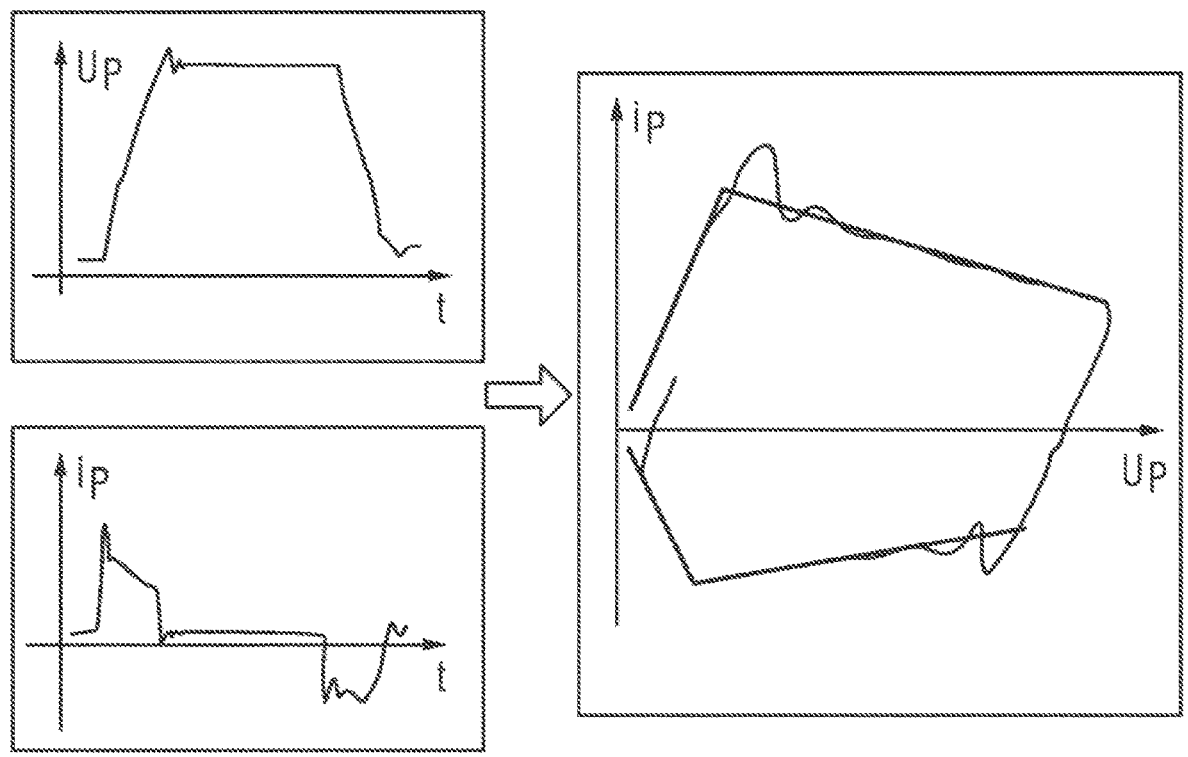
FIG. 6 shows graphs for illustrating a voltage profile, a current profile and a current/voltage graph, incorporating teachings of the present disclosure.

FIG. 6 shows graphs for illustrating the profile of the piezo voltage over time, the profile of the piezo current over time and a current/voltage characteristic curve of the output stage derived therefrom. Said current profile and said voltage profile are identified using sensors whose output signals are supplied to the control unit via A/D converters. In the control unit, filtering takes place to eliminate the influence of undesired interference frequencies and the already stored current/voltage characteristic curve is adapted by the newly identified current/voltage characteristic curve, which is associated with the individually present injection system and usually deviates from the originally identified current/voltage characteristic curve illustrated in FIG. 3.

Figure 7:
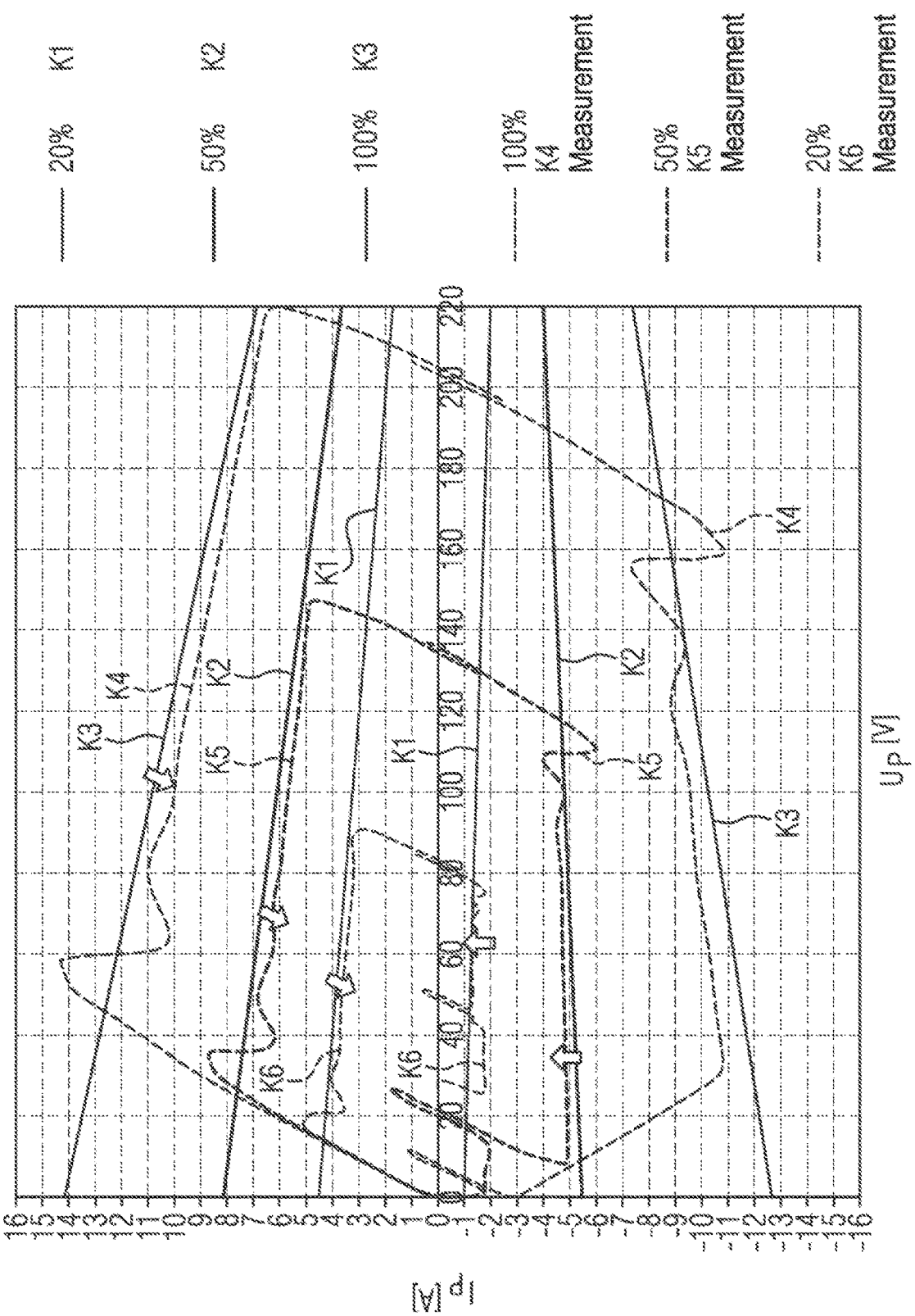
FIG. 7 shows a graph for illustrating the adaptation of stored current/voltage characteristic curves, incorporating teachings of the present disclosure.

FIG. 7 shows a graph for illustrating the adaptation of stored current/voltage characteristic curves. Here, the solid lines are the stored standard characteristic curves of the output stage, which can be described by the mentioned polynomial. The dashed lines are the actual characteristic curves created in the control unit for an individual injection system. The deviation between the gradients represents the necessary adaptation of the standard characteristic curve (polynomial). The illustrated arrows characterize the necessary adaptation of the respective standard characteristic curve identified by means of the polynomial model to the respective actual characteristic curve.

Figure 8:
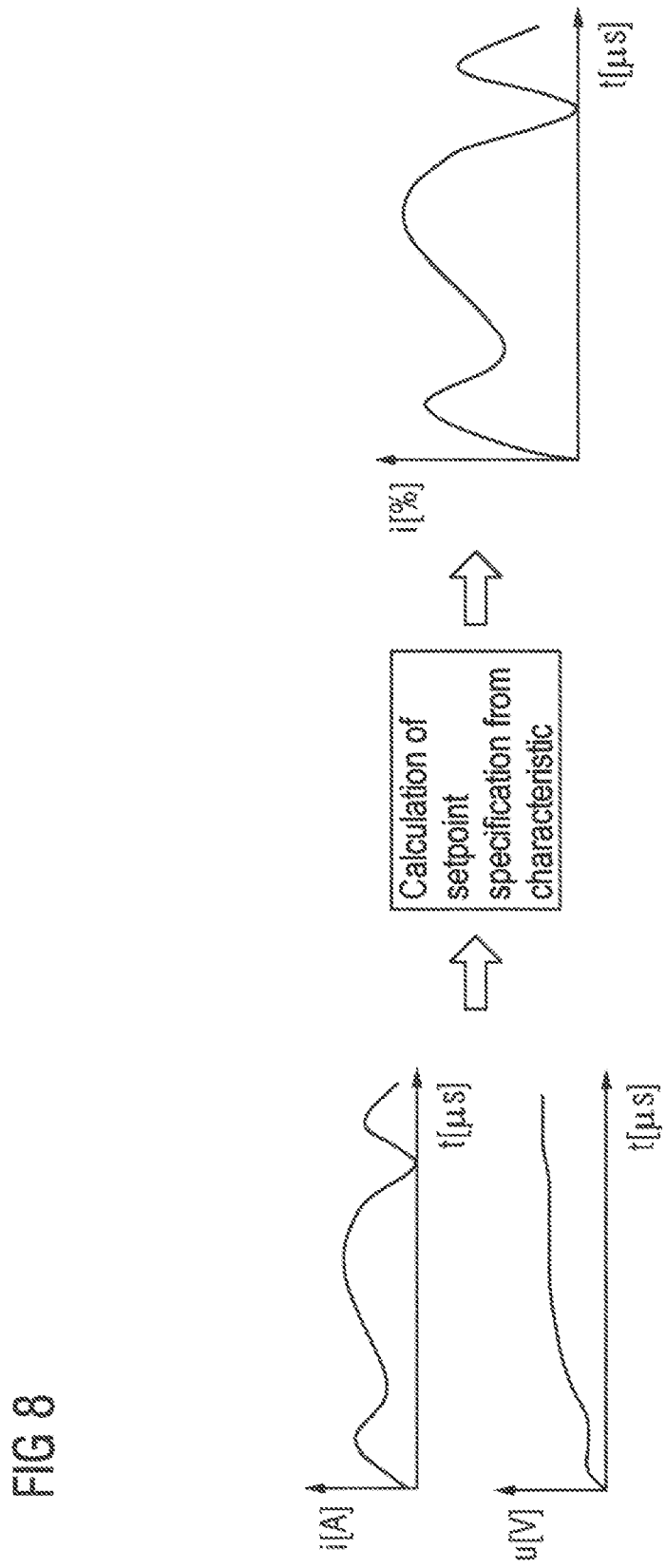
FIG. 8 shows graphs for illustrating the identification of the desired behavior of the injection valve taking into account the actual behavior of the actuator (output stage) incorporating teachings of the present disclosure.

FIG. 8 shows graphs for illustrating the identification of the desired behavior of the piezo current during a subsequent injection process. First of all, in the control unit, by evaluating sensor signals describing the actual state of the injection system, the desired actual behavior of the piezo current over time is identified and the desired actual behavior of the piezo voltage is identified over time. From the desired actual behavior of the piezo current and the desired actual behavior of the piezo voltage, the desired profile of the piezo current over time is then identified using the stored current/voltage characteristic curves. This identified desired profile is adapted to the individually present injection system, i.e. has been identified taking into account the tolerances and the line system of the individually present injection system. In this case, temperature dependencies of the output stage characteristic are also taken into account, since the time constant of the temperature response is considerably greater than the time constant by means of which the stored current/voltage characteristic curves were adapted.

FIG. 9 shows a block illustration of a control unit 1, which makes available the control signals s1 and s2 (shown in FIG. 1) for the transistors T1 and T2 of the buck-boost converter. Said control unit 1 has an identification unit 2, which identifies input parameters p1, . . . , pn for the regression model 4 from input signals e1, . . . , em supplied to the control unit, using operating programs and characteristic maps stored in a memory 3. The stored characteristic maps include, among other things, a characteristic map, which contains as standard or reference characteristic curves empirically identified current/voltage characteristic curves for different setpoint current prescriptions, wherein said current/voltage characteristic curves—as has been explained above—are adapted during operation of the fuel injection system using identified profiles of the current flowing through the piezo actuator during an injection process and the voltage dropped across the piezo element.

The regression model 4, which is, as described above, a polynomial regression model which, in the exemplary embodiment shown above, carries out regression in the form of a two-dimensional polynomial with coefficients a to f, identifies, from the input parameters supplied to it, energization data preferably including an energization period BD and a setpoint current intensity SS, given as percentages. Furthermore, the regression model 4 preferably also identifies, from the input parameters supplied to it, an absolute current intensity AS, given as a percentage, which is supplied to an external controller 6.

The specified energization data BD and SS are supplied to a converter unit 5, which converts the identified energization data to the control signals s1 and s2 for the transistors T1 and T2.

The input signals e1, . . . , em of the control unit 1 are data characterizing or describing the instantaneous operating point of the injection system. These data, which are made available by sensors, by way of example include information about the fuel pressure in the rail of the internal combustion engine, information about the position of the accelerator pedal, information about the temperature of the fuel upstream of the high-pressure fuel pump and information about the temperature of the piezo actuator. Furthermore, the input signals e1, . . . , em include sensor signals describing the profile of the current $i_P$ flowing through the piezo actuator P during an injection process and the profile of the voltage $U_P$ dropped at the piezo actuator P during the injection process. The consideration of this current profile and the voltage profile provides conclusions about the individual behavior of each existing injection system including the respective existing lines and existing components in the control unit, in this case especially the power output stage, as is shown in FIG. 1.

The input parameters p1, . . . , pn of the regression model 4 are, in particular, information about the desired piezo voltage and/or information about the desired piezo charge and information about the temperature of the piezo actuator. Furthermore, the input parameters of the regression model preferably also include information about the desired opening behavior of the injection valve, information about a desired oscillation behavior of the piezo actuator, information about system-specific parameters such as, for example, the internal resistance of the piezo actuator and information about further boundary conditions of the injection system, for example information about a maximum time window available for the energization.

What is claimed is:

1. A method for actuating a piezo actuator of an injection valve of a fuel injection system using a controller with a processor and a memory storing instructions, the method comprising:
   activating the processor to access and execute the instructions stored in the memory;
   wherein the instructions, when executed by the processor, cause the processor to:
      determine actuation signals for the piezo actuator using a stored current/voltage characteristic curve for carrying out an injection process;
      detect the profile of the current flowing through the piezo actuator during the injection process and the profile of the voltage applied to the piezo actuator during the injection process;
      adapt the stored current/voltage characteristic curve based at least in part on the detected current profile and the detected voltage profile; and
      determine actuation signals for the piezo actuator using the stored, adapted current/voltage characteristic curve for carrying out a subsequent injection process.

2. The method as claimed in claim 1, wherein the instructions further cause the processor to identify a free setpoint current prescription independent of the trapezoidal shape taking into account the actual behavior of the individual injection system.

3. The method as claimed in claim 1, wherein the instructions further cause the processor to filter the measured current profile and the measured voltage profile or the current/voltage characteristic identified therefrom before adapting the stored current/voltage characteristic curve.

4. A device for a fuel injection system, the device comprising:
   a processor; and
   a memory storing a current/voltage characteristic curve for activating a piezo actuator for a fuel injector to carry out an injection process;
   wherein the processor executes commands to determine actuation signals for the piezo actuator using the stored characteristic curve;
   detects the profile of the current flowing through the piezo actuator during the injection process and the profile of the voltage applied to the piezo actuator during the injection process;
   adapts the memory to change current/voltage characteristic curve based at least in part on the detected current profile and the detected voltage profile; and
   determines actuation signals for the piezo actuator using the stored, adapted current/voltage characteristic curve for carrying out a subsequent injection process.

5. The device for a fuel injection system as claimed in claim 4, wherein the processor executes commands to identify a free setpoint current prescription independent of the trapezoidal shape taking into account the actual behavior of the individual injection system.

6. The method as claimed in claim 4, wherein the processor executes commands to filter the measured current profile and the measured voltage profile or the current/voltage characteristic identified therefrom before adapting the stored current/voltage characteristic curve.

* * * * *